(12) United States Patent
Berstis

(10) Patent No.: US 7,048,195 B2
(45) Date of Patent: May 23, 2006

(54) ELECTRONICALLY EXPIRING DEVICE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 10/612,520

(22) Filed: Jul. 2, 2003

(65) Prior Publication Data
US 2005/0001040 A1      Jan. 6, 2005

(51) Int. Cl.
*G06K 19/06* (2006.01)
(52) U.S. Cl. ........................... 235/492; 235/487
(58) Field of Classification Search ................ 235/492, 235/375, 376, 487; 368/86–89, 107, 108, 368/121
See application file for complete search history.

(56) References Cited

U.S. PATENT DOCUMENTS

| | | | | |
|---|---|---|---|---|
| 4,546,241 A | * | 10/1985 | Walton | 235/380 |
| 4,730,285 A | * | 3/1988 | Lie | 368/90 |
| 6,080,649 A | | 6/2000 | Werner et al. | 438/601 |
| 6,303,980 B1 | * | 10/2001 | Werner et al. | 257/665 |
| 6,501,107 B1 | | 12/2002 | Sinclair et al. | 257/209 |
| 6,705,532 B1 | * | 3/2004 | Broadhurst | 235/492 |

OTHER PUBLICATIONS

U.S. Appl. No. 09/703,340, Berstis et al., Sensing Methods and Devices for Batteryless, Oscillatorless, Binary Time Cell Usable as an Horological Device, filed Oct. 31, 2000.
U.S. Appl. No. 09/703,334, Berstis et al., Sensing Methods and Devices for Batteryless, Oscillatorless, Analog Time Cell Usable as an Horological Device, Oct. 31, 2000.

\* cited by examiner

*Primary Examiner*—Daniel Stcyr
(74) *Attorney, Agent, or Firm*—Duke W. Yee; David A. Mims, Jr.; Gerald H. Glanzman

(57) ABSTRACT

The present invention relates to a method and system for expiring a device after a predetermined time period has elapsed. A device, which contains its own internal time cell, is designed to stop working or self-destruct after a predetermined time period has expired. The device uses its own time cell so that the elapsed time period is not altered through an external time source. After the predetermined time period has elapsed, the device or a component of the device self-destructs when connected to a power source.

12 Claims, 1 Drawing Sheet

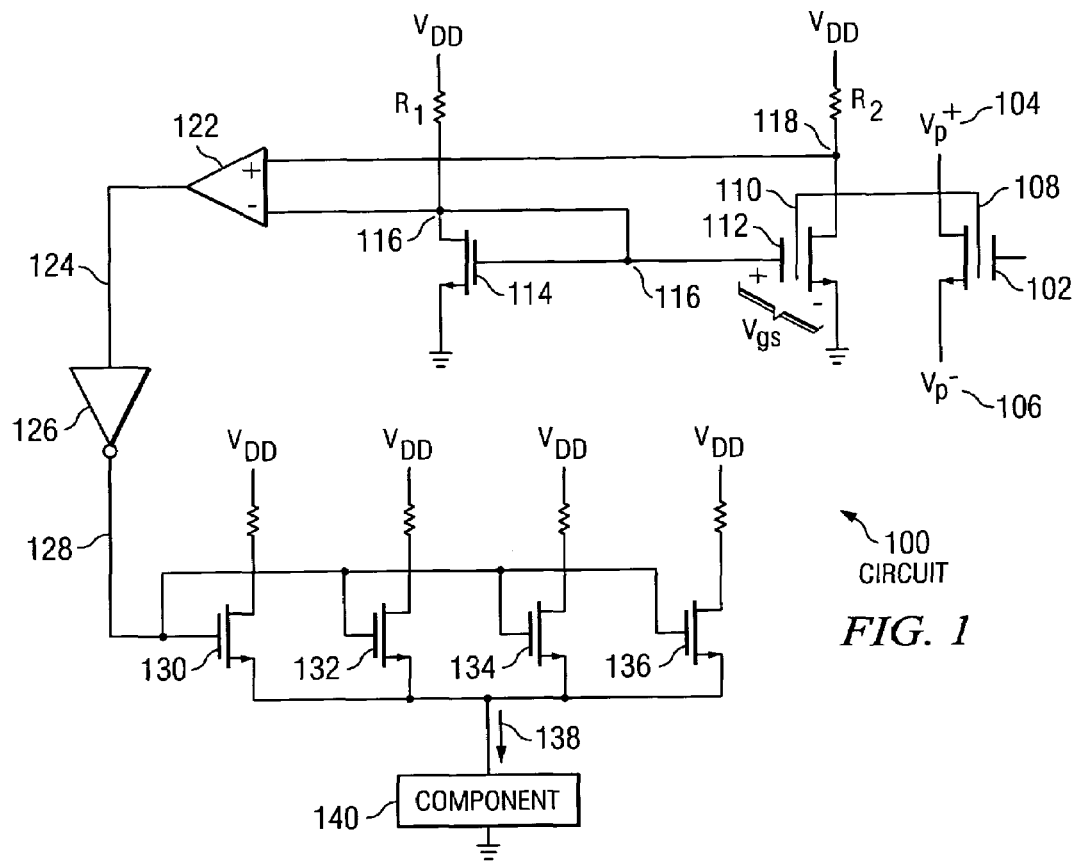
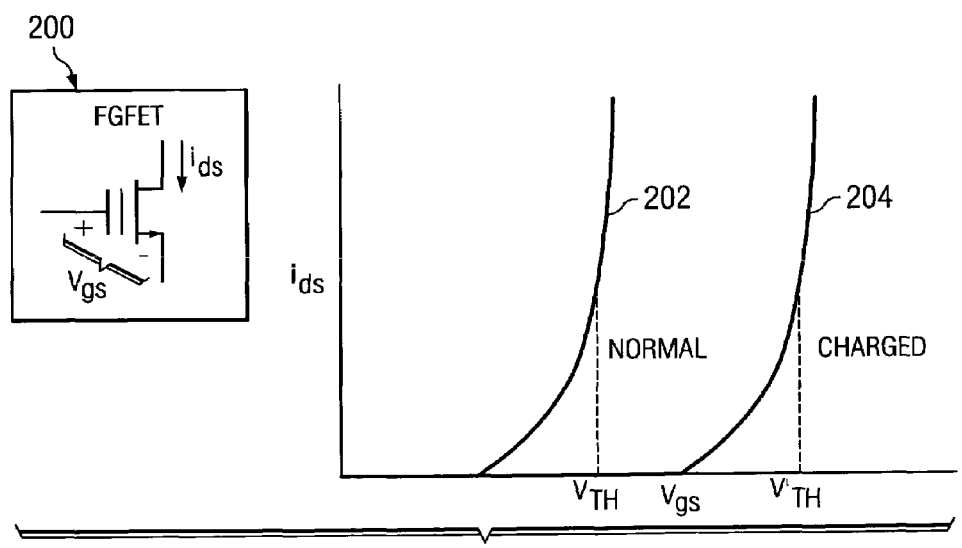
FIG. 2

ELECTRONICALLY EXPIRING DEVICE

CROSS REFERENCE TO RELATED APPLICATIONS

The present invention is related to U.S. patent applications entitled "SENSING METHODS AND DEVICES FOR A BATTERYLESS, OSCILLATORLESS, BINARY TIME CELL USABLE AS AN HOROLOGICAL DEVICE," application Ser. No. 09/703,340 filed on Oct. 31, 2000, now U.S. Pat. No. 6,829,200 B1; and "SENSING METHODS AND DEVICES FOR A BATTERYLESS, OSCILLATORLESS, ANALOG TIME CELL USABLE AS AN HOROLOGICAL DEVICE," application Ser. No. 09/703,334 filed on Oct. 31, 2000, now U.S. Pat. No. 6,826,128 B1; both of which are assigned to the same assignee and incorporated herein by reference.

BACKGROUND OF THE INVENTION

1. Technical Field

The present invention relates to horology and, in particular, to methods and devices for time measurement using an electrical time base. Still more particularly, the present invention provides a method and system for expiring a device after a predetermined amount of time has elapsed.

2. Description of Related Art

Portable electronic devices have become ubiquitous, and as the size and cost of electronic circuits continues to be reduced, electronic devices continue to be incorporated in an increasing number of consumer products. As an example, paper greeting cards that play music when opened are no longer considered a novelty. Technical progress has been made on flexible circuits that will allow electronic circuits to created in a variety of shapes and to be embedded into more products.

Inexpensive electronic devices can be categorized based upon their power requirements or associated power systems. Some electronic devices have a variety of functions that may require the device to be powered by an external power source, such as an electrical outlet via an AC-DC adapter, while some devices require one or more batteries. Other devices may require both types of power sources: an external power source for enabling most functions, and a small battery for powering minor functions, such as a clock or timekeeping function, while not connected to an external power source or while "turned off". Small electronic devices frequently incorporate a small, flat battery, similar to those that power electronic watches, merely to power a clock circuit. Generally, the battery powers some type of time base oscillator or pulse generator that measures the passage of units of time. Devices may also contain a tiny, simple, electronic, horological device or "time cell" that provides time measurement without a battery, radioactivity, or an oscillator as described in incorporated U.S. patent application Ser. Nos. 09/703,340 and 09/703,334.

There are many credit card-like "value cards" for telephone service, grocery store discounts, frequent flyer miles, hotel door entry, and purchases. Smart cards are prime examples of value cards that may be made to contain a time cell. Some value cards have expiration dates. Enforcement of the expiration date can be difficult. For example, if a credit card has an expired date, a person must identify that the credit card is expired by receiving a rejection from a central server for the credit card and/or verifying that the current date is greater than the expired date. Current expiration methods include manual processes, such as cutting a credit card in half, expiring a value card using an external card reader with a reasonably correct time setting, and expiring a value card at a central server.

Therefore, it would be advantageous for a device to self-destruct after a predetermined amount of time has elapsed.

SUMMARY OF THE INVENTION

The present invention relates to a method and system for expiring a device after a predetermined time period has elapsed. A device, which contains its own internal time cell, is designed to stop working or self-destruct after a predetermined time period has expired. The device uses its own time cell so that the elapsed time period is not altered through an external time source. After the predetermined time period has elapsed, the device or a component of the device self-destructs when connected to a power source.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a circuit diagram in accordance with a preferred embodiment of the present invention; and FIG. 2 is a diagram providing a symbolic representation of a floating gate field effect transistor and associated graph depicting its drain-source current with respect to its gate-source voltage in accordance with a preferred embodiment of the present invention.

DETAILED DESCRIPTION OF THE PREFERRED EMBODIMENT

In the preferred embodiment of the present invention, a device self-destructs when connected to a power source after a predetermined time period has elapsed. The device contains its own internal time cell. The state of the time cell is read and a determination is made as to whether or not the predetermined time period has elapsed since the time cell was programmed. If the predetermined time period has elapsed, the device or a component of the device self-destructs when connected to a power source.

There are many possible applications for a preferred embodiment of the present invention. For example, there are credit card-like and smart card-like "value cards" for telephone service, store discounts, frequent flyer miles, purchases, and hotel door access, which may have expiration dates or may have additional benefits if an expiration date is incorporated into the value card. Business models for many of these cards might be improved if the card expired on its own rather than expiring it at some control server. For example, a vendor may sell 1000 minute phone cards that must be used up in approximately 1 month, after that time the card loses all of its value; therefore allowing the vendor to offer lower cost service in such business models.

The entertainment industry is looking for ways to increase revenue by controlling usage of their "content." A video game, once purchased, permits the user unlimited use. However, the provider might prefer to sell the game for a lower cost if the game contained a built-in predetermined life-time span allowing the user to have unlimited playing for a predetermined time period. A VCR or other type of recorder might be sold with the ability to copy "content" for only a limited time period. Copying license fees may be associated with the recording device rather than the recording media.

There are additional advantages for expiring devices after a predetermined time period. For example, ink cartridges may be designed to automatically disable when exceeding an expiration date so that the partially dried ink cannot clog a printer. Another advantage is that a company producing a device with a predetermined life span would only need to provide a warranty and parts to support the technology of the device for the predetermined time.

With reference now to the figures, FIG. 1 is a circuit diagram in accordance with a preferred embodiment of the present invention. Circuit 100 may be used to cause a device to self-destruct after a predetermined time period has elapsed.

Circuit 100 contains a programming floating gate field effect transmitter (FGFET), such as programming FGFET 102. FGFETs are frequently used in read-only memory (ROM) circuits. The interested reader is directed to Sedra & Smith, *Microelectronic Circuits*, 3$^{rd}$ Edition, Oxford, 1991, pp. 965–970 for additional details regarding FGFETs, although it should be recognized that FGFETs are well-known components to those skilled in the art. Programming FGFET 102 is used to program circuit 100 to cause the destruction of circuit component 140, thus disabling an electronic device relying on component 140. Applying a programming voltage across terminal 104 and 106 causes some of the electrons flowing through programming FGFET 102 to become "hot" (i.e., high energy) and drift onto floating gate 108 through a well-known process known as Fowler-Nordheim tunneling. This causes floating gate 108 to develop a negative charge. Programming FGFET 102 is programmed by applying a programming voltage (usually about 20 volts) across positive programming terminal 104 and negative programming terminal 106. The hot electrons are discharged through Fowler-Nordheim tunneling to floating gate 108. Fowler-Nordheim tunneling is described in more detail in the incorporated U.S. patent application Ser. Nos. 09/703,340 and 09/703,334. Floating gate 108 is connected to floating gate 110 of chargeless FGFET 112, which causes floating gate 110 to develop the same negative charge. The negative charge on floating gate 110 affects the voltage-current relationship of FGFET 112, as shown in FIG. 2.

The graph depicted in FIG. 2 shows the voltage relation ship between the gate-source voltage $V_{gs}$ and drain-source current $i_{ds}$ for FGFET 200 in a state in which the floating gate is negatively charged and in a "normal" (i.e., non-programmed) state. In the "normal" state, represented by curve 202, FGFET 200 operates just like a conventional MOSFET (metal-oxide semiconductor FET). Applying a gate-source voltage that exceeds a threshold voltage $V_{TH}$ turns on FGFET 200, so that current flows relatively freely from drain to source. When the floating gate of FGFET 200 has been programmed with a negative charge, however, the $i_{ds}$–$V_{gs}$ curve shifts to the right, as represented by curve 204. In this case, a higher threshold voltage $V^1_{TH}$ must be exceeded in order to turn on FGFET 200.

Over time, however, the floating gate of a programmed (charged) FGFET loses electrons, and current $i_{ds}$ decreases. The electric potential generated by the stored electrons diminishes, and the threshold voltage for FGFET 200 begins to shift back to its normal or non-programmed threshold voltage. Since the amount of chargeloss that occurs over time can be predicted (as described in the incorporated U.S. patent application Ser. Nos. 09/703,340 and 09/703,334), the shifting of the $i_{ds}$–$V_{gs}$ curve for an FGFET may be used to measure an elapsed amount of time, which is what circuit 100 in FIG. 1 does.

Returning to FIG. 1, diode-connected NFET 114 (N-channel FET) has been constructed so that it has operational characteristics that are nearly identical to those of chargeless FGFET 112 when chargeless FGFET 112 is in a normal or non-programmed state of operation. In other words, diode-connected NFET 114 and chargeless FGFET 112 are matched such that they have nearly identical $i_{ds}$–$V_{gs}$ curves, such as curve 202 in FIG. 2, over the same range of inputs. Resistances $R_1$ and $R_2$ are also equal.

The inputs to the gate and drain of diode-connected NFET 114 are shorted at node 116, so the drain-source voltage and the gate-source voltage of diode-connected NFET 114 are equal, which places diode-connected NFET 114 into saturation mode and causes diode-connected NFET 114 to act as a constant current source. Since the current flowing through resistor $R_1$ is constant, the drop in potential across $R_1$ is constant, and the voltage at node 116 remains at a constant value, somewhere between ground and $V_{DD}$. Since the gates of chargeless FGFET 112 and diode-connected NFET 114 are connected and the two transistors are matched, when chargeless FGFET 112 is in a non-programmed state, chargeless FGFET 112 and diode-connected NFET 114 form a current mirror and the current through the chargeless FGFET 112 is equal to the current through the diode-connected NFET 114. Hence, in the non-programmed state, the voltage at node 118 equals the voltage at node 116 since the resistance of $R_2$ equals the resistance of $R_1$.

After programming, however, the threshold voltage of the chargeless FGFET 112 is increased. Since the gate-source voltage $V_{gs}$ is constant and equal to the voltage at node 116, programming causes chargeless FGFET 112 to no longer be turned on at this constant $V_{gs}$ voltage. Since this prevents current from flowing through resistor $R_2$, node 118 is at approximately the source voltage level ($V_{DD}$) when chargeless FGFET 112 is in the programmed state.

Difference amplifier 122 subtracts the voltages at nodes 118 and 116 to output the difference at node 124. Since after programming, the voltage at node 116 is somewhat less than $V_{DD}$ and the voltage at node 118 is approximately equal to $V_{DD}$, the voltage at node 124 would be equal to the difference between the voltages at nodes 118 and 116. The voltage at node 124 could thus be considered at a logic-high level after programming chargeless FGFET 112. A digital inverter, such as inverter 126, outputs the logical complement of its input. Thus, the output of inverter 126 (node 128) is at a logic-low level when FGFET 112 is in the programmed state.

Over time, the floating gate of chargeless FGFET 112 loses its charge. Thus, once a predetermined period of time has elapsed, the voltages at nodes 118 and 116 are equal. Difference amplifier 122 thus outputs a voltage at node 124 equal to zero (or logic-low). Inverter 126 receives this logic-low voltage at node 124 and outputs a logic-high voltage at node 128. An expired flag may be set at this time to indicate that the predetermined period of time has elapsed.

This logic-high voltage is applied to NFETs 130, 132, 134, and 136. NFETs 130, 132, 134, and 136 are turned on to cause a high current, such as current 138, to flow through component 140, which, in a preferred embodiment might be a fusible link. This high current 138 causes component 140 to be destroyed, thus disabling some circuit that depends on component 140.

One of ordinary skill in the art will appreciate that although circuit 100 must be connected to a power source (i.e., $V_{DD}$ and ground) in order for circuit 100 to destroy component 140, it is not necessary for circuit 100 to be powered in order for floating gate 110 to lose its programmed charge. Thus, a preferred embodiment of the present invention can measure the time to expiration without relying on any power source. This is an advantage in an application such as a smart card or other small, highly portable device that may not have its own power source.

In an alternate embodiment, a device may be designed to drain a memory content of the device by draining charges from memory cells over a predetermined time period. Thus, certain certificate information or other vital information would be automatically removed from the device after the predetermined time period has elapsed. This draining of memory can be accomplish even without power being applied to the device if FGFETs are used to store the data, since as has been demonstrated, the rate of chargeloss of an FGFET can be controlled.

In yet another alternate embodiment, additional cryptographic circuitry may be included in the device to disallow a time cell to be reprogrammed in the absence of a valid encryption key. Initially, the time cell may be programmed using a unique encryption key either during the manufacturing process or after the device is deployed. The original encryption key code may be discarded or erased to prevent further programming. Alternatively, a mechanism may be established to allow an external command encoded with a valid encryption key to reprogram the time cell. An encryption method and key length may be implemented to achieve the desired level of security.

Thus, the present invention provides an improved method, apparatus, and computer instructions for expiring a device or a component within a device after a predetermined time period has elapsed. After a predetermined time period has elapsed, the device is designed to self-destruct when connected to a power source. The time cell of the device is used to determine the elapsed time period; therefore, eliminating potential problems with users tampering with external time sources to alter the predetermined time period for expiration.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for expiring a device containing a time cell, the method comprising:

performing a programming operation, wherein the programming operation sets a predetermined time period for the time cell;

discharging a stored electrostatic charge in a charge storage element in the time cell, wherein the time cell has a substantially discharged state before the programming operation and has a controlled discharge state after the programming operation, and wherein the time cell transitions after the programming operation from the controlled discharge state to the substantially discharged state within the predetermined time period after the programming operation;

reading a state of the time cell;

generating a signal from the state of the time cell, wherein the signal indicates whether or not the predetermined time period has elapsed since the time cell was programmed; and in response to the signal indicating that the predetermined time period has elapsed, expiring the device;

wherein the charge storage element in the time cell includes a floating gate field effect transistor;

wherein the floating gate field effect transistor is configured within the time cell such that the floating gate field effect transistor turns on in response to applying power to the time cell after the predetermined time period has elapsed;

wherein turning on the floating gate field effect transistor causes the signal to be generated;

wherein the time cell includes a first node, a second node, and a difference amplifier that is connected to the first node and second node; and wherein when power is applied to the time cell, the first node reaches a predetermined voltage, the second node reaches a voltage that is determined by an amount of charge stored in a floating gate of the floating gate field effect transistor, and the difference amplifier outputs a voltage that is a difference between the voltage of the first node and the voltage of the second node.

2. The method of claim 1 further comprising wherein expiring the device includes:

disabling a function or component of the device when the device is exposed to a power source.

3. The method of claim 1 further comprising wherein expiring the device includes:

destroying at least a portion of the device when the device is exposed to a power source.

4. The method of claim 3, wherein the at least a portion of the device includes an electrical connection.

5. The method of claim 4, wherein the electrical connection is one of a fusible link and a wire.

6. The method of claim 1, wherein the expiring step further comprises:

draining charges from memory cells.

7. The method of claim 1, wherein the expiring step further comprises:

setting an expired flag.

8. The method of claim 7 further comprising wherein expiring the device includes:

destroying at least a portion of the device when the device is exposed to a power source.

9. The method of claim 1, wherein the device is at least one of a smart card, a value card, a phone card, a credit card, a hotel card, a frequent flyer card, a discount card, a video game, an electronic machine, and an ink cartridge.

10. A system for expiring a device containing a time cell, the system comprising:

performing means for performing a programming operation, wherein the programming operation sets a predetermined time period for the time cell;

discharging means for discharging a stored electrostatic charge in a charge storage element in the time cell, wherein the time cell has a substantially discharged state before the programming operation and has a controlled discharge state after the programming operation, and wherein the time cell transitions after the programming operation from the controlled discharge state to the substantially discharged state within the predetermined time period after the programming operation;

reading means for reading a state of the time cell;

generating means for generating a signal from the state of the time cell, wherein the signal indicates whether or not the predetermined time period has elapsed since the time cell was programmed; and in response to the signal indicating that the predetermined time period has elapsed, expiring means for expiring the device;

wherein the charge storage element in the time cell includes a floating gate field effect transistor;

wherein the floating gate field effect transistor is configured within the cell such that the floating gate field effect transistor turns on in response to applying power to the time cell after the predetermined time period has elapsed;

wherein turning on the floating gate field effect transistor causes the signal to be generated;

wherein the time cell includes a first node, a second node, and a difference amplifier that is connected to the first node and second node; and wherein when power is applied to the time cell, the first node reaches a predetermined voltage, the second node reaches a voltage that is determined by an amount of charge stored in a floating gate of the floating gate field effect transistor, and the difference amplifier outputs a voltage that is a difference between the voltage of the first node and the voltage of the second node.

11. A self-expiring device comprising:

a time cell, wherein discharge of a stored charge within the time cell causes operating characteristics of at least one component within the time cell to vary in a controlled fashion with the passage of time, such that the time cell becomes capable of producing a time-expiration signal after a predetermined time period has elapsed;

at least one additional circuit component that is required for proper operation of the device;

disabling circuitry, wherein the disabling circuitry responds to the time cells producing an expiration signal by disabling the at least one additional circuit component;

wherein the at least one component within the time cell includes a floating gate field effect transistor;

wherein the floating gate field effect transistor is configured within the time cell such that the floating gate field effect transistor turns on in response to applying power to the time cell after the predetermined period of time has elapsed;

wherein turning on the floating gate field effect transistor causes the time expiration signal to be produced;

wherein the time cell includes a first node, a second node, and a difference amplifier that is connected to the first node and second node; and wherein when power is applied to the time cell, the first node reaches a predetermined voltage, the second node reaches a voltage that is determined by an amount of charge stored in a floating gate of the floating gate field effect transistor, and the difference amplifier outputs a voltage that is a difference between the voltage of the first node and to voltage of the second node.

12. The device of claim 11, wherein the first node is connected to a gate terminal of the floating gate field effect transistor and the second node is connected to one of a drain terminal of the floating gate field effect transistor and a source terminal of the floating gate field effect transistor.

\* \* \* \* \*